United States Patent
Jokela et al.

(10) Patent No.: US 11,706,668 B2
(45) Date of Patent: Jul. 18, 2023

(54) SIGNALLING IMPROVEMENT IN CONDITIONAL HANDOVER

(71) Applicant: NOKIA TECHNOLOGIES OY, Espoo (FI)

(72) Inventors: Tommi Jokela, Espoo (FI); Mikko Saily, Laukkoski (FI); Sofonias Hailu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 333 days.

(21) Appl. No.: 17/266,849

(22) PCT Filed: Aug. 8, 2018

(86) PCT No.: PCT/EP2018/071453
§ 371 (c)(1),
(2) Date: Feb. 8, 2021

(87) PCT Pub. No.: WO2020/030258
PCT Pub. Date: Feb. 13, 2020

(65) Prior Publication Data
US 2021/0297907 A1    Sep. 23, 2021

(51) Int. Cl.
*H04W 36/00*    (2009.01)
*H04W 36/30*    (2009.01)
*H04W 76/30*    (2018.01)

(52) U.S. Cl.
CPC . *H04W 36/0016* (2013.01); *H04W 36/00837* (2018.08); *H04W 36/30* (2013.01); *H04W 76/30* (2018.02)

(58) Field of Classification Search
CPC ....... H04W 36/0016; H04W 36/00837; H04W 36/30; H04W 76/30; H04W 36/0083; H04W 36/0055
See application file for complete search history.

(56) References Cited

U.S. PATENT DOCUMENTS 9,629,178 B2    4/2017  Lee et al.
11,343,722 B2 *  5/2022  Koskela .......... H04W 36/00837
(Continued)

FOREIGN PATENT DOCUMENTS

WO    WO 2018/127389 A1    7/2018

OTHER PUBLICATIONS

First Examination Report dated Jan. 21, 2022 corresponding to Indian Patent Application No. 202147008033.
(Continued)

*Primary Examiner* — Ahmed Elallam
(74) *Attorney, Agent, or Firm* — Squire Patton Boggs (US) LLP

(57) ABSTRACT

An apparatus comprising means for performing: receiving, while connected to a first cell, preparation information for preparing the apparatus for a conditional handover of the apparatus to at least one other cell; receiving, from the first cell, a message, wherein the message causes the apparatus to transition from a connected state to an inactive state; receiving, from the first cell, information of a release condition; when it is determined that the release condition is met, sending a release indication and releasing the preparation information from the apparatus.

16 Claims, 8 Drawing Sheets

(56) References Cited

U.S. PATENT DOCUMENTS

2019/0380081 A1* 12/2019 Chang .................. H04W 36/18
2021/0235333 A1* 7/2021 Saily .................. H04W 36/305

OTHER PUBLICATIONS

International Search Report and Written Opinion dated Oct. 4, 2018 corresponding to International Patent Application No. PCT/EP2018/071453.
Intel Corporation, "Analysis of conditional handover," 3GPP Draft; R2-1703415, 3GPP TSG RAN WG2 Meeting #97bis, Spokane, USA, Apr. 3-7, 2017, Apr. 3, 2017, XP051245271.
Samsung, "Conditional Handover: Event Design Aspects," 3GPP Draft; R2-1713843, 3GPP TSG RAN WG2 Meeting #100, Reno, USA Nov. 27-Dec. 1, 2017, Nov. 17, 2017, XP051372490.

* cited by examiner

SIGNALLING IMPROVEMENT IN CONDITIONAL HANDOVER

TECHNICAL FIELD

Various examples relate to a method, apparatus and a computer program. More particularly, various examples relate to handover procedures.

BACKGROUND

When moving between radio cells, an apparatus such as a user equipment (UE) may be subject to handovers between base stations managing the radio cells, in order to keep the apparatus connected to a radio network.

SUMMARY

According to a first aspect, there is provided an apparatus comprising means for performing: receiving, while connected to a first cell, preparation information for preparing the apparatus for a conditional handover of the apparatus to at least one other cell; receiving, from the first cell, a message, wherein the message causes the apparatus to transition from a connected state to an inactive state; receiving, from the first cell, information of a release condition; when it is determined that the release condition is met, sending a release indication and releasing the preparation information from the apparatus.

In an example, the message comprises information of the release condition.

In an example, determining that the information of the release condition is met comprises determining that a cell quality of a cell of the at least one other cell is below a quality threshold.

In an example, determining that the release condition is met comprises determining that a cell quality of a cell of the at least one other cell is a predetermined number of decibels below a cell quality of another cell.

In an example, the another cell comprises the first cell.

In an example, cell quality may comprise at least one of: Reference Signal Received Power, Reference Signal Received Quality and Signal to Interference Noise Ratio.

In an example the release indication is for releasing preparation information of the cell of the at least one other cell.

In an example, the determining that the release condition is met comprises determining that a timer has expired.

In an example, the timer is reset when the message is received from the first cell.

In an example, the release indication is for releasing preparation information of all cells prepared for a conditional handover.

In an example, the release indication is sent to the first cell.

In an example, when the release indication is sent to the cell other than the first cell the first cell is informed by the cell other than the first cell.

In an example, the apparatus comprises a user equipment.

In an example, the release indication is sent without the apparatus transitioning from the inactive state to the connected state.

According to a second aspect, there is provided an apparatus comprising means for performing: sending, to a user equipment, preparation information for preparing the user equipment for a conditional handover to at least one cell; sending, to the user equipment, a message, wherein the message causes the user equipment to transition from a connected state to an inactive state; sending, to the user equipment, information of a release condition; and receiving, from the user equipment, a release indication for the at least one cell when it is determined that the release condition is met.

In an example, the message comprises the information of the release condition.

In an example, the release condition is determined to be met when a cell quality of a cell of the at least one cell drops below a quality threshold.

In an example, the release condition is met when the cell quality of a cell of the at least one cell drops a predetermined number of decibels below a cell quality of another cell.

In an example, the another cell comprises the first cell.

In an example, cell quality may comprise at least one of: Reference Signal Received Power, Reference Signal Received Quality and Signal to Interference Noise Ratio.

In an example, the release indication is for releasing preparation information of the cell of the at least one cell.

In an example, the release condition is met when a timer at the user equipment expires.

In an example, the timer is reset when the message is received from the first cell.

In an example, wherein preparation information for all cells prepared for a conditional handover are released in response to determining that the release condition has been met.

In an example, the apparatus comprises a base station.

According to a third aspect, there is provided an apparatus comprising means for performing: sending, to a user equipment, preparation information for preparing the user equipment for a conditional handover to at least one cell; sending, to the user equipment, a first message, wherein the message causes the user equipment to transition from a connected state to an inactive state; sending, to the user equipment, information of a release condition; and at a time after sending, to the user equipment, information of the release condition, sending, to the user equipment, a second message comprising instructions for the user equipment to transition from the inactive state to the connected state, wherein the second message comprises an indication of whether the user equipment should retain or discard part or all of the preparation information for the at least one cell.

According to a fourth aspect, there is provided an apparatus comprising means for performing: sending, to a user equipment, preparation information for preparing a conditional handover of the user equipment to at least one cell; sending, to the user equipment, a message, wherein the message causes the user equipment to transition from a connected state to an inactive state; determining that a release condition has been met, and in response to the release condition being met, initiating a release of the at least one cell.

According to a fifth aspect, there is provided a method comprising: receiving, while connected to a first cell, preparation information for preparing the apparatus for a conditional handover to at least one other cell; receiving, from the first cell, a message, wherein the message causes the apparatus to transition from a connected state to an inactive state; receiving, from the first cell, information of a release condition; when it is determined that the release condition is met, sending a release indication and releasing the preparation information.

In an example, the message comprises information of the release condition.

In an example, determining that the information of the release condition is met comprises determining that a cell quality of a cell of the at least one other cell is below a quality threshold.

In an example, determining that the release condition is met comprises determining that a cell quality of a cell of the at least one other cell is a predetermined number of decibels below a cell quality of another cell.

In an example, the another cell comprises the first cell.

In an example, cell quality may comprise at least one of: Reference Signal Received Power, Reference Signal Received Quality and Signal to Interference Noise Ratio.

In an example, the release indication is for releasing preparation information of the cell of the at least one other cell.

In an example, the determining that the release condition is met comprises determining that a timer has expired.

In an example, the method comprises resetting the timer when the message is received from the first cell.

In an example, the release indication is for releasing preparation information of all cells prepared for a conditional handover.

In an example, the release indication is sent to the first cell in an example, when the release indication is sent to the cell other than the first cell the first cell is informed by the cell other than the first cell.

In an example, the method is performed by a user equipment.

In an example, the method comprises sending the release indication without transitioning from the inactive state to the connected state.

According to a sixth aspect, there is provided a method comprising: sending, to a user equipment, preparation information for preparing the user equipment for a conditional handover to at least one cell; sending, to the user equipment, a message, wherein the message causes the user equipment to transition from a connected state to an inactive state; sending, to the user equipment, information of a release condition; and receiving, from the user equipment, a release indication for the at least one cell when it is determined that the release condition is met.

In an example, the message comprises the information of the release condition.

In an example, the release condition is determined to be met when a cell quality of a cell of the at least one cell is below a quality threshold.

In an example, wherein the release condition is determined to be met when the cell quality of a cell of the at least one cell drops a predetermined number of decibels below a cell quality of another cell.

In an example, the another cell comprises the first cell.

In an example, cell quality may comprise at least one of: Reference Signal Received Power, Reference Signal Received Quality and Signal to Interference Noise Ratio.

In an example, the release indication is for releasing preparation information of the cell of the at least one cell.

In an example, the release condition is met when a timer at the user equipment expires.

In an example, the timer is reset when the message is received from the first cell.

In an example, preparation information for all cells prepared for a conditional handover are released in response to determining that the release condition has been met.

In an example, the method is performed by a base station.

According to a seventh aspect, there is provided a method comprising: sending, to a user equipment, preparation information for preparing the user equipment for a conditional handover to at least one cell; sending, to the user equipment, a first message, wherein the message causes the user equipment to transition from a connected state to an inactive state; sending, to the user equipment, information of a release condition; and at a time after sending, to the user equipment, information of the release condition, sending, to the user equipment, a second message comprising instructions for the user equipment to transition from the inactive state to the connected state, wherein the second message comprises an indication of whether the user equipment should retain or discard part or all of the preparation information for the at least one cell.

According to an eighth aspect, there is provided a method comprising: sending, to a user equipment, preparation information for preparing a conditional handover of the user equipment to at least one cell; sending, to the user equipment, a message, wherein the message causes the user equipment to transition from a connected state to an inactive state; determining that a release condition has been met, and in response to the release condition being met, initiating a release of the at least one cell.

According to a ninth aspect there is provided a computer program comprising instructions for causing an apparatus to perform at least the following: receiving, while connected to a first cell, preparation information for preparing the apparatus for a conditional handover to at least one other cell; receiving, from the first cell, a message, wherein the message causes the apparatus to transition from a connected state to an inactive state; receiving, from the first cell, information of a release condition; when it is determined that the release condition is met, sending a release indication and releasing the preparation information.

According to a tenth aspect there is provided a computer program comprising instructions for causing an apparatus to perform at least the following: sending, to a user equipment, preparation information for preparing the user equipment for a conditional handover to at least one cell; sending, to the user equipment, a message, wherein the message causes the user equipment to transition from a connected state to an inactive state; sending, to the user equipment, information of a release condition; and receiving, from the user equipment, a release indication for the at least one cell when it is determined that the release condition is met.

According to an eleventh aspect there is provided an apparatus comprising: at least one processor; at least one memory including computer program code; wherein the at least one memory and computer program code is configured to, with the at least one processor, cause the apparatus at least to perform the steps of the fifth, sixth, seventh or eighth aspects.

According to a twelfth aspect, there is provided a non-transitory computer readable medium comprising program instructions for causing an apparatus to perform at least the steps of the fifth, sixth, seventh or eighth aspects.

According to a thirteenth aspect there is provided a computer program comprising instructions stored thereon for performing at least the steps of the fifth, sixth, seventh or eighth aspects.

According to a fourteenth aspect there is provided a non-transitory computer readable medium comprising program instructions thereon for performing at least the steps of the fifth, sixth, seventh or eighth aspects.

In the above, various aspects have been described. It should be appreciated that further aspects may be provided by the combination of any two or more of the aspects described above.

Various other aspects and further embodiments are also described in the following detailed description and in the attached claims.

BRIEF DESCRIPTION OF THE DRAWINGS

To assist understanding of the present disclosure and to show how some embodiments may be put into effect, reference is made by way of example only to the accompanying drawings in which.

DETAILED DESCRIPTION

Some examples may be provided in the context of cell handovers.

Failed handovers negatively impact the service quality provided to a User Equipment (UE) in a cellular system. In Long Term Evolution (LTE), failed handovers can be caused by failure of handover preparation signalling. For example, failed handovers can be caused by failure of a measurement report or a handover command.

Handover preparation failures could be mitigated, or avoided, by an earlier preparation of target cells. A target cell can be considered to be a cell which a UE attempts to handover to from a source cell. In 3GPP (3G Partnership Project), this technique is known as UE based Handover or Conditional HandOver (CHO). In the preparation phase of CHO, a network prepares a set of candidate cells based on a measurement report from the UE, and signals preparation information of the candidate cells to the UE. The preparation may comprise Radio Resource Control (RRC) configurations of the candidate cells and an execution trigger. In the execution phase of CHO, the UE may trigger a random access to a target cell based on the execution trigger configured by the network.

Figure 1:
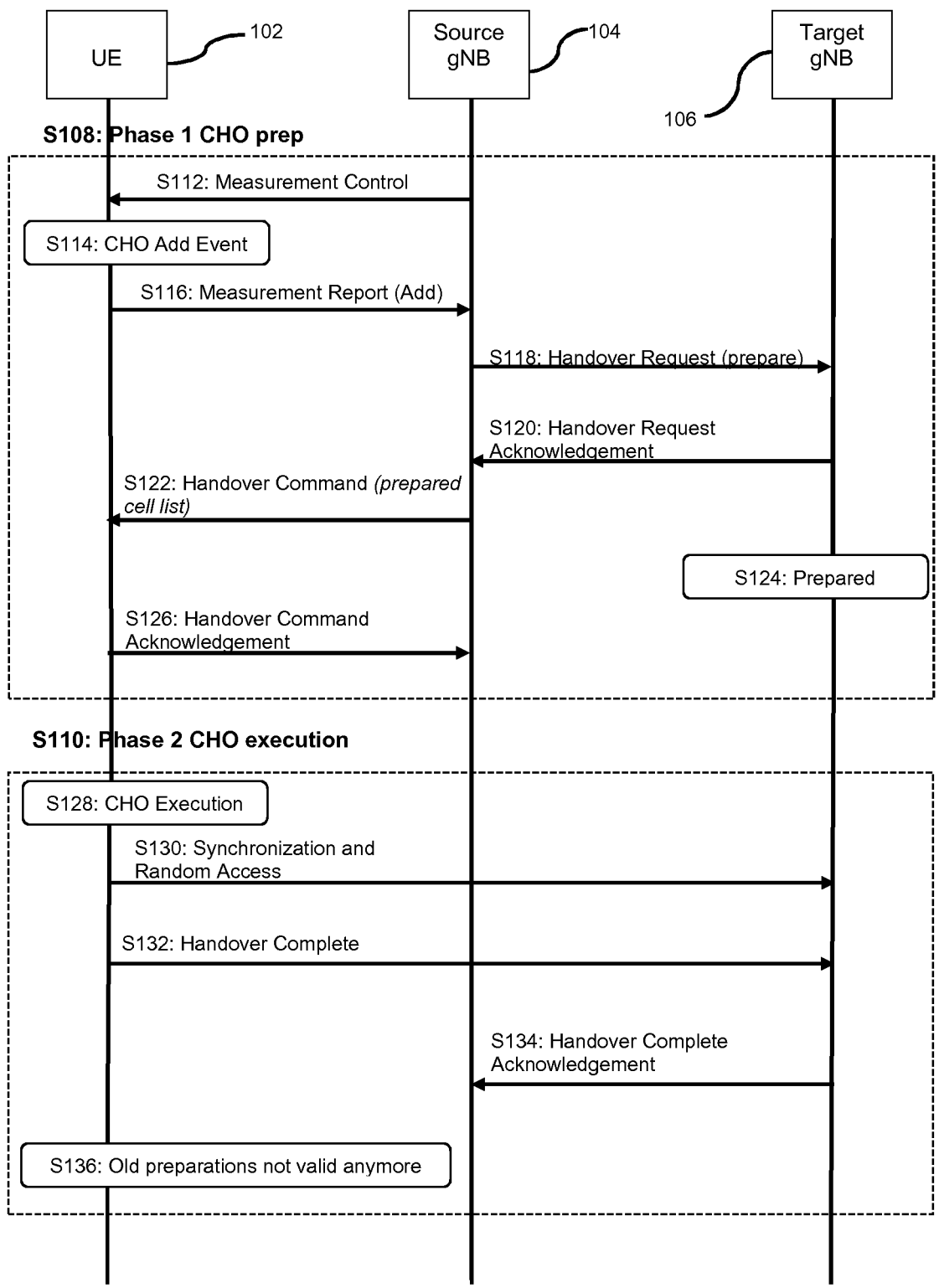
FIG. 1 shows schematically an example of a Conditional HandOver (CHO) procedure.

An example of a CHO procedure is shown in FIG. 1. In this example, the CHO procedure comprises two phases: a CHO preparation phase shown at S108 in FIG. 1, and a CHO execution phase shown at S110 in FIG. 1.

At the beginning of S108, a source base station, such as a source gNB 104 is connected to the UE. At S112, a measurement control message is sent to UE 102. In response, a CHO Add Event takes place at the UE in S114.

At S116, a measurement report is sent from the UE to the source gNB. Based on the measurement report, the source gNB can prepare a set of candidate cells for handover. The set of candidate cells may comprise, for example, target gNB 106.

At s118, source gNB 104 sends a handover preparation request for UE 102 to target gNB 106. The handover preparation request may comprise an instruction for target gNB 106 to prepare for the handover. In response to the handover preparation request, target gNB 106 may send a handover preparation request acknowledgement at S120. At S122, source gNB 104 sends a handover command message to UE 102. The handover command message may comprise a list of prepared cells (or cells in the process of preparing for handover). The handover command message may also comprise RRC configurations of prepared cells (or cells in the process of preparing for handover). In examples, the handover command message may also comprise an execution trigger. In response to the handover command message sent at S122, UE 102 sends a handover command acknowledgement message at S126.

At S124, target gNB is in a state where it has made preparations for handover. This may comprise, for example, reserving resources for a potential handover of UE 102 from source gNB 104.

In examples, the second phase of a CHO handover, shown at S110 of FIG. 1, may be triggered by an execution trigger at the UE. The execution trigger may be configured by a network connected to the UE. The execution trigger may be sent from source gNB 104 to UE 102. At S128, the UE begins the CHO execution phase. At S130, the UE triggers a random access to target gNB 106. At S132, UE 102 sends a handover complete message to target gNB 106. At S134, target gNB 106 sends a handover complete acknowledgement message to source gNB 104.

In examples, at the end of the CHO execution phase S110, the old CHO preparations for the UE are no longer valid as shown at S136.

In 3GPP TS 38.300, a UE state RRC_INACTIVE is specified for NG-RAN (Next Generation Radio Access Network). In this UE state, a UE remains in a CM-CONNECTED (Connection Management-CONNECTED) state and can move within an area configured by an NG-RAN without notifying the NG-RAN. This area is known as a Radio Access Network Notification Area (RNA). In RRC_INACTIVE, the last serving gNB node can keep the UE context and the UE-associated connection with a serving Access and Mobility Management Function (AMF) and a User Plane Function (UPF).

Figure 2:
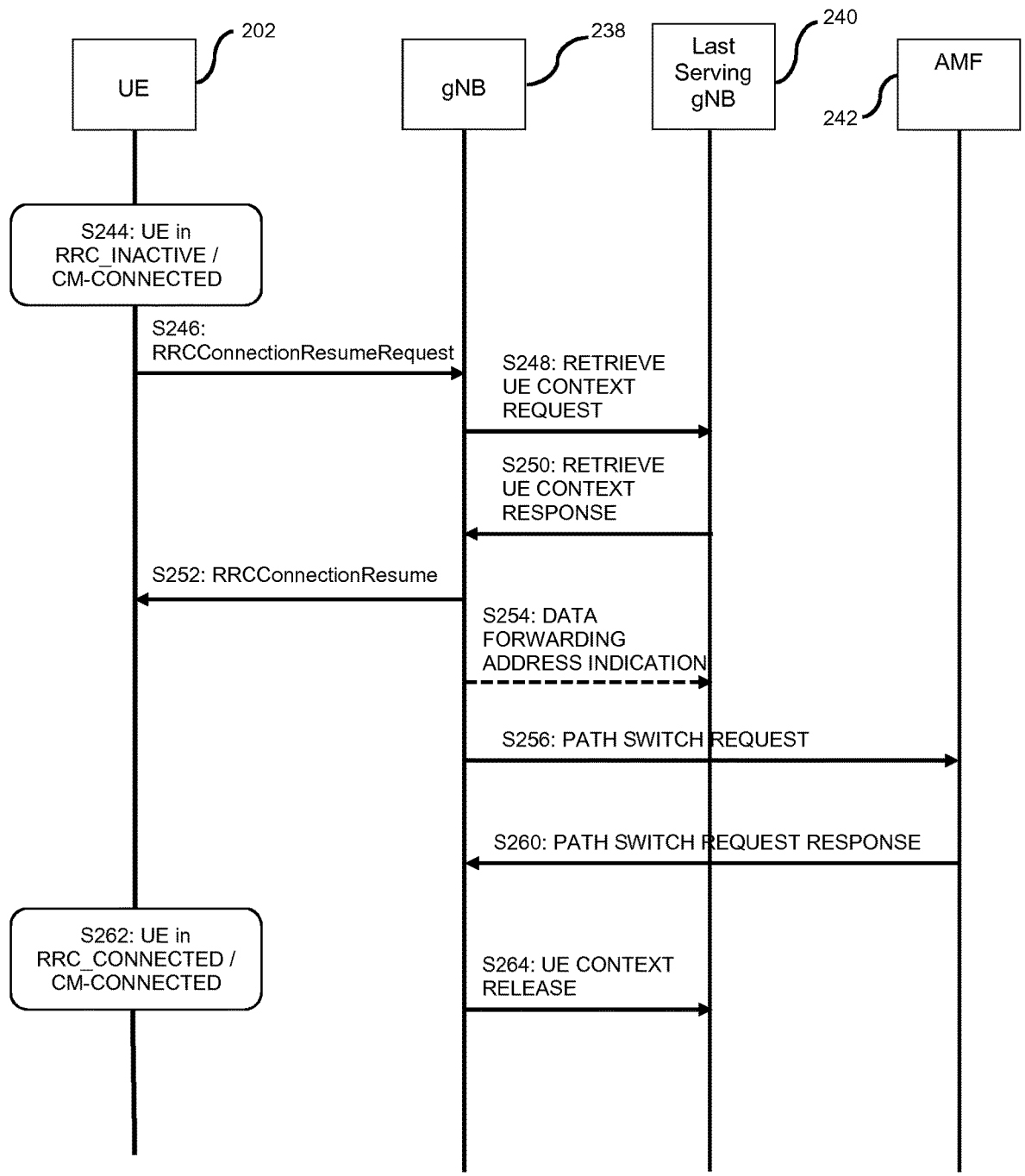
FIG. 2 shows schematically an example of a transition of an apparatus from an inactive state to an active state.

FIG. 2 shows an example of a UE triggered transition from an inactive state (RRC_INACTIVE) to a connected state (RRC_CONNECTED). It is to be appreciated that certain steps of FIG. 2 can be performed in an order other than that shown in FIG. 2, and that some steps of FIG. 2 may be optional in some examples.

At S244 of FIG. 2, UE 202 is in an RRC_INACTIVE/CM-CONNECTED state. At S246, UE 202 resumes from RRC-INACTIVE and sends an RRCConnectionResumeRequest message to gNB 238. Then, at S248, gNB 238 requests the last serving gNB 240 to provide UE context data. In response, the last serving gNB 240 provides UE context data to gNB 238, as shown at S250. The RRC connection is then resumed at S252 by gNB 238.

At S254, there is an optional data forwarding address indication sent from gNB 238 to the last serving gNB 240. This can be used to prevent loss of downlink user data buffered in the last serving gNB 240.

At S256 and S260 a path switch is performed by gNB 238 contacting AMF 242 at S256 and receiving a response at S260.

At S262, the UE is in an RRC_CONNECTED/CM-CONNECTED state. At S264 gNB 238 triggers the release of the UE resources at the last serving gNB 240.

Figure 3:
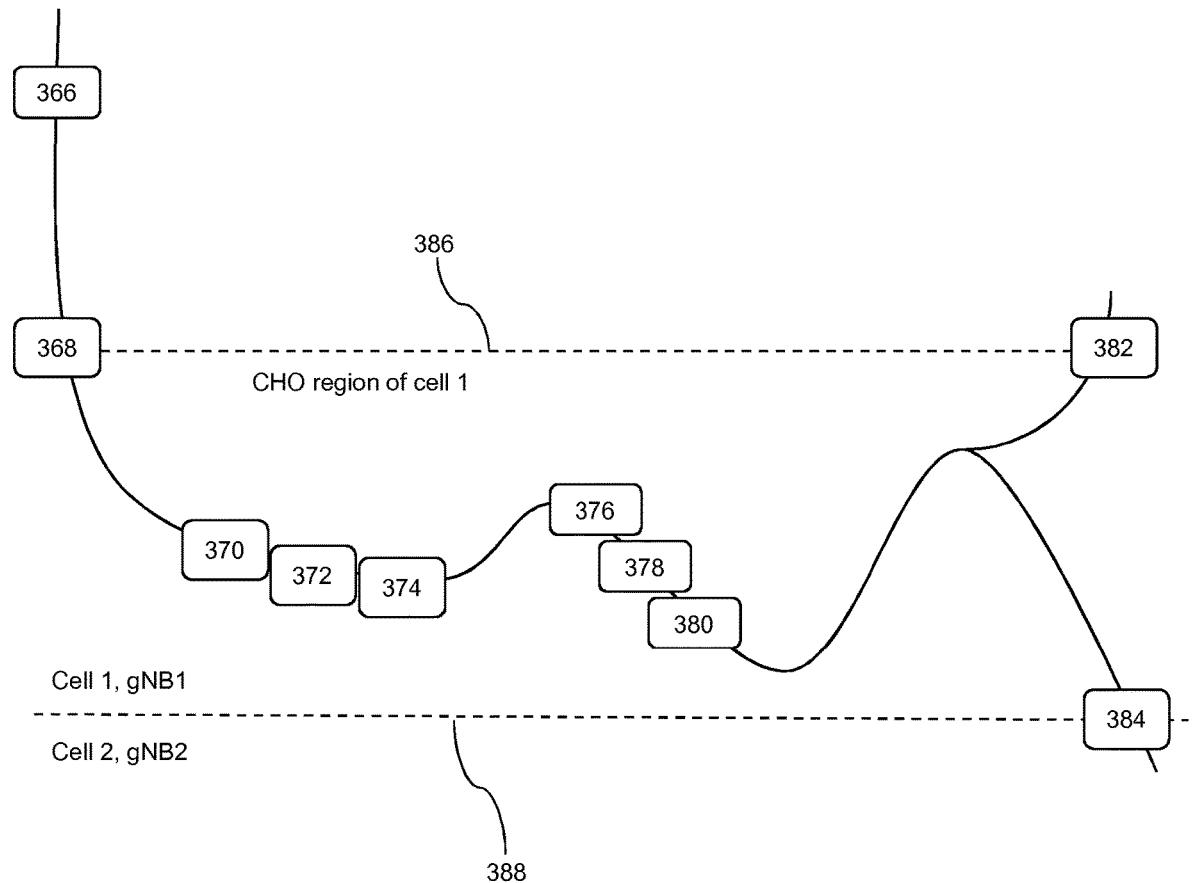
FIG. 3 shows schematically an example of different positions of an apparatus.

FIG. 3 shows a situation where a UE transitions between a connected state (for example, an RRC_CONNECTED state) and an inactive state (for example, an RRC_INACTIVE state).

In the exemplary scenario shown in FIG. 3, a UE approaches Cell 2 (hosted by gNB 2) from Cell 1 (hosted by gNB 1). During the approach, the UE may enter a region of cell 1 where candidate target cells are prepared for the UE. This region may be considered a "CHO region" of cell 1. The candidate target cells may be prepared using the CHO procedure described above. A candidate target cell may be cell 2.

At position 366 shown in FIG. 3, data may arrive at the UE or at gNB1 triggering the UE to transition to a connected state, such as an RRC_CONNECTED state for example. The data may arrive at a buffer of gNB1.

At position 368, as the UE crosses a boundary 386 within cell 1 into the CHO region of cell 1. The UE is then prepared for CHO. A similar procedure to the exemplary procedure shown in FIG. 1 may be used. For example, the CHO preparation may comprise the following steps:
 a. The UE sends a Measurement Report to gNB1;
 b. gNB1 sends a Conditional Handover Preparation Request message to gNB2;
 c. gNB2 reserves resources for the UE and prepares an RRC reconfiguration to be (potentially) applied by the UE in the CHO execution phase;
 d. gNB2 sends a CHO Request ACK message to gNB1, containing the RRC configuration for Cell 2;
 e. gNB1 sends a CHO Command message to UE, containing the RRC configuration for Cell 2 and a CHO execution trigger; and
 f. UE stores the RRC configuration in its memory and starts evaluating the CHO execution trigger.

Following the CHO preparation at position 368, there may be a period of time where there is inactivity in uplink and downlink data transmission. This time period may occur when the UE is at position 370, for example. An inactivity timer may expire during this time period. The inactivity timer may, for example, be located at gNB1 or the UE. It should be noted, however, that other inactivity timer locations may be used. When the inactivity timer expires, an RRC connection for the UE is suspended. This may happen when the UE is at position 372, for example.

During the RRC connection suspend procedure, without any information on how to handle prepared cells in the inactive state (such as the RRC_INACTIVE state), the UE will release any cell preparation information. This may happen when the UE is at position 374 of FIG. 3, for example. In order to release the prepared target cell(s), gNB1 is required to send a CHO Release message to the prepared target cell(s) and the respective gNBs of the prepared target cells then release the reserved resources in their cells and send a CHO Release Acknowledgement message to gNB1. In an example where cell 2 is the only prepared target cell, in order to release the prepared target cell the following steps are taken:
 a. gNB1 sends a CHO Release message to gNB2;
 b. gNB2 releases the reserved resources in Cell 2;
 c. gNB2 responds with a CHO Release ACK message.

In examples, at position 376, there is uplink or downlink activity for the UE. The RRC connection is then resumed at position 378, for example. At position 380, the cycle of steps for each position 368, 370, 372, 374, 376 and 378 described above may be repeated indefinitely.

The steps described for each position 368, 370, 372, 374, 376, 378 and 380 may repeat until either: the UE leaves the CHO region of Cell 1 (for example, at position 382) triggering a release of the prepared cells; or the UE accesses one of the prepared cells (at position 384). In examples, the UE accesses one of the prepared cells when it crosses a cell boundary 388 between cell 1 and cell 2.

When the UE transitions repeatedly between a connected state and an inactive state, there may be excessive signalling overhead caused by preparing and releasing CHO target cells. This signalling overhead may be increased when there is a slow moving UE, a short inactivity timer value for suspending and/or a long CHO deconfiguration timer value. In this situation, there may be a high number of preparation/release cycles before a UE enters a target cell or preparations are released following elapse of the CHO deconfiguration timer. As each preparation cycle comprises each of the steps described for positions 368 to 378 above, there is potential for a large amount of signalling in both UE-gNB interfaces and gNB-gNB interfaces.

Also, during repeated preparation/release cycles, it will take time after the RRC connection is resumed to prepare candidate target cells using the CHO procedure again. This increases the probability of failed handovers. This delay is due to UE measurement (for example, L1 filtering, L3 filtering, Time To Trigger (TTT)) and cell preparation signalling (as described for position 368 of FIG. 3).

In order to reduce signalling overhead and to decrease the probability of failed handovers, a release condition can be used to control when a prepared cell should be released. Releasing a prepared cell may comprise a UE releasing (i.e. no longer storing) preparation information, such as RRC configurations. Releasing a prepared cell may also comprise a release of reserved resources on the network side (for example, a gNB may release resources reserved for a UE).

Figure 4:
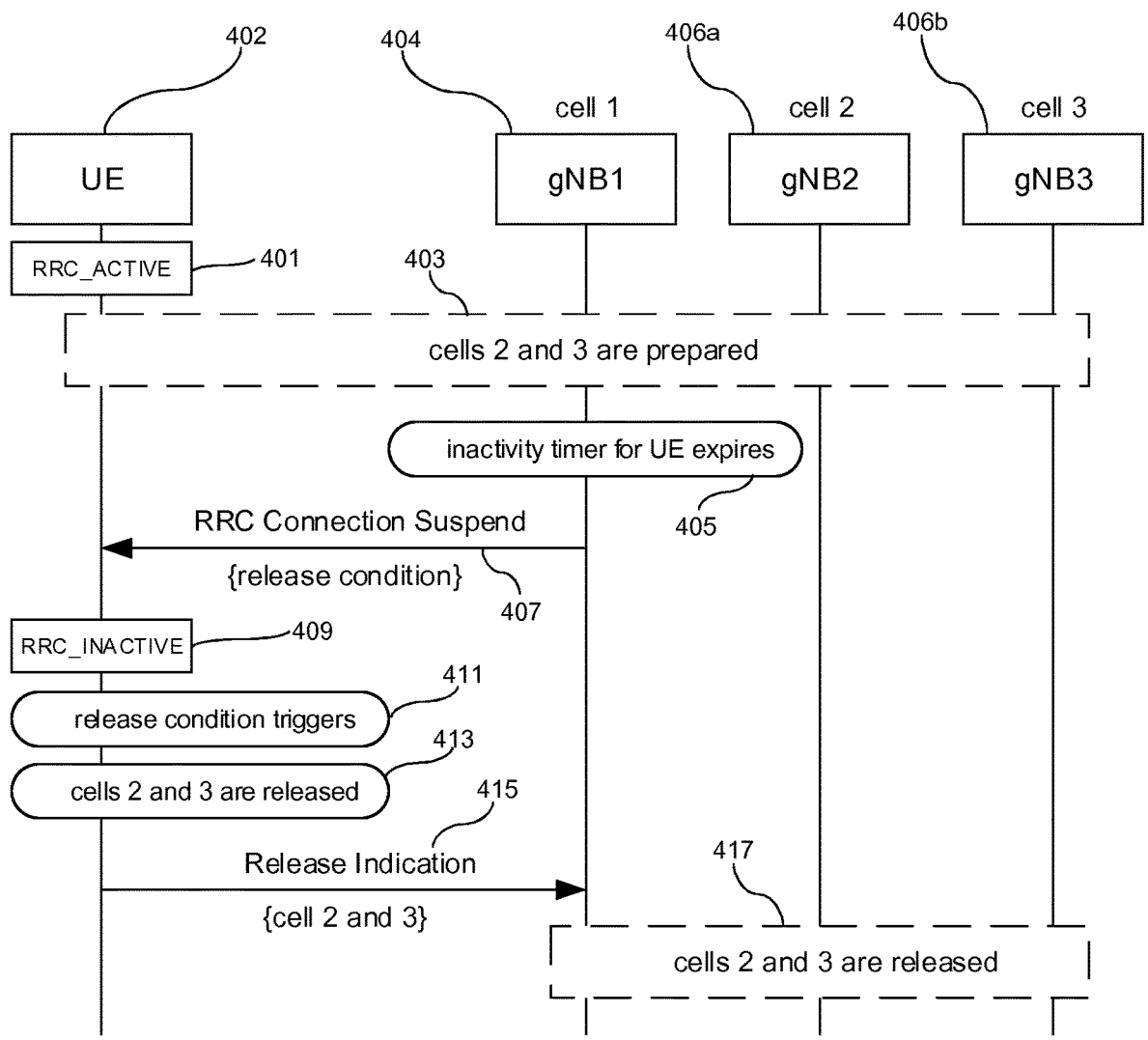
FIG. 4 shows an example of a method for communicating between an apparatus and a network.

FIG. 4 shows an example where a release condition for a prepared cell is used. In FIG. 4, communications between UE 402, gNB1 404, gNB2 406a and gNB3 406b are shown, however it will be appreciated that further UEs and base stations may also be involved in the communication procedure. In this example, cell 1 is managed by gNB1 404, cell 2 is managed by gNB2 406a and cell 3 is managed by gNB3 406b. Other configurations are also envisaged.

At 401 of FIG. 4, UE 402 is in an active state (for example RRC_ACTIVE). At 403, cells 2 and 3 are prepared for a conditional handover based on a measurement report from UE 402. At 405, there is an interruption in the data activity lasting longer than a configured inactivity time. In examples, this inactivity time may be pre-configured at gNB1 404.

In response to the expiry of the inactivity timer at 405, at 407 gNB1 404 sends a RRC Connection Suspend message to UE 402. This message may contain a release condition which controls how long the UE shall keep the prepared cells configuration. In some examples, a prepared cell is released only when a release condition is met. In some examples, the release condition may also be sent to the UE 402 separately to the RRC Connection Suspend message.

In examples, the release condition may be related to cell quality of a prepared cell. Possible measures of cell quality which may be used include Reference Signal Received Power (RSRP), Reference Signal Received Quality (RSRQ) and Signal to Interference Noise Ratio (SINR).

In an example, the release condition could be a threshold of cell quality for prepared cells 406a, 406b. When a cell quality drops below the quality threshold, the cell may be released. In another example, when the cell quality of a best prepared cell drops below a configured threshold, all prepared cells may be released. In examples, the best prepared cell may be the cell with the highest cell quality.

In an example, the release condition may be whether a prepared cell drops X dB below the quality of cell C, where X is a predetermined number. Cell C could be any configured cell. Cell C could be the cell where the RRC Connection Suspend took place (in the example of FIG. 4, this is gNB1 404). When the release condition is fulfilled, the cell which has dropped X dB below the quality of cell C may be released. In examples, when the cell quality of the best prepared cell drops X dB below the quality of cell C, all prepared cells are released.

In an example, the release condition may be related to a timer. The timer may be a UE timer. When the timer elapses prepared cell may be released. In examples, the timer is set to a configured value at the connections suspend 407. The timer may be reset at state transitions. In other examples, the timer could be a common timer for both active and connected states i.e. not reset at state transitions.

Advantageously, for the above described release conditions, no additional UE measurements are required. The same measurements used for cell-reselection can be used. Therefore, in examples, an increase in UE power consumption can be avoided.

At 409, UE 402 is in an inactive state (e.g. RRC_INACTIVE). At 411, the release condition triggers in UE 402 and the prepared cells are released according to the release condition. In the example shown in FIG. 4, cells 2 and 3 managed by gNB2 406a and gNB3 406b are released at S413, however as described above, in some examples only one cell may be released.

At 415, UE 402 sends a Release Indication message to gNB1 404, containing a list of cells to be released. This message may be transmitted by using an efficient small data transmission method, if specified for RRC_INACTIVE state, to avoid a full transition to an RRC_CONNECTED state. At 417, the network releases prepared cells 406a and 406b according to the request.

In examples where the cell to which the UE 402 sent the Release Indication was the Last Serving gNB, the Last Serving gNB sends a Release Request message to all gNBs with cells to be released, receiving ACKs for a response. As a result, all cells can be released in the network side.

In examples where the cell to which the UE 402 sent the Release Indication was not the Last Serving gNB, there may be an extra step of contacting the Last Serving gNB, which will then trigger the release procedure.

In another example, the release of the prepared cells may be initiated at the network side instead of at the UE. For example, release may be initiated based on an elapse of a timer at a base station (e.g. gNB1 404) or based on uplink measurements.

Figure 5:
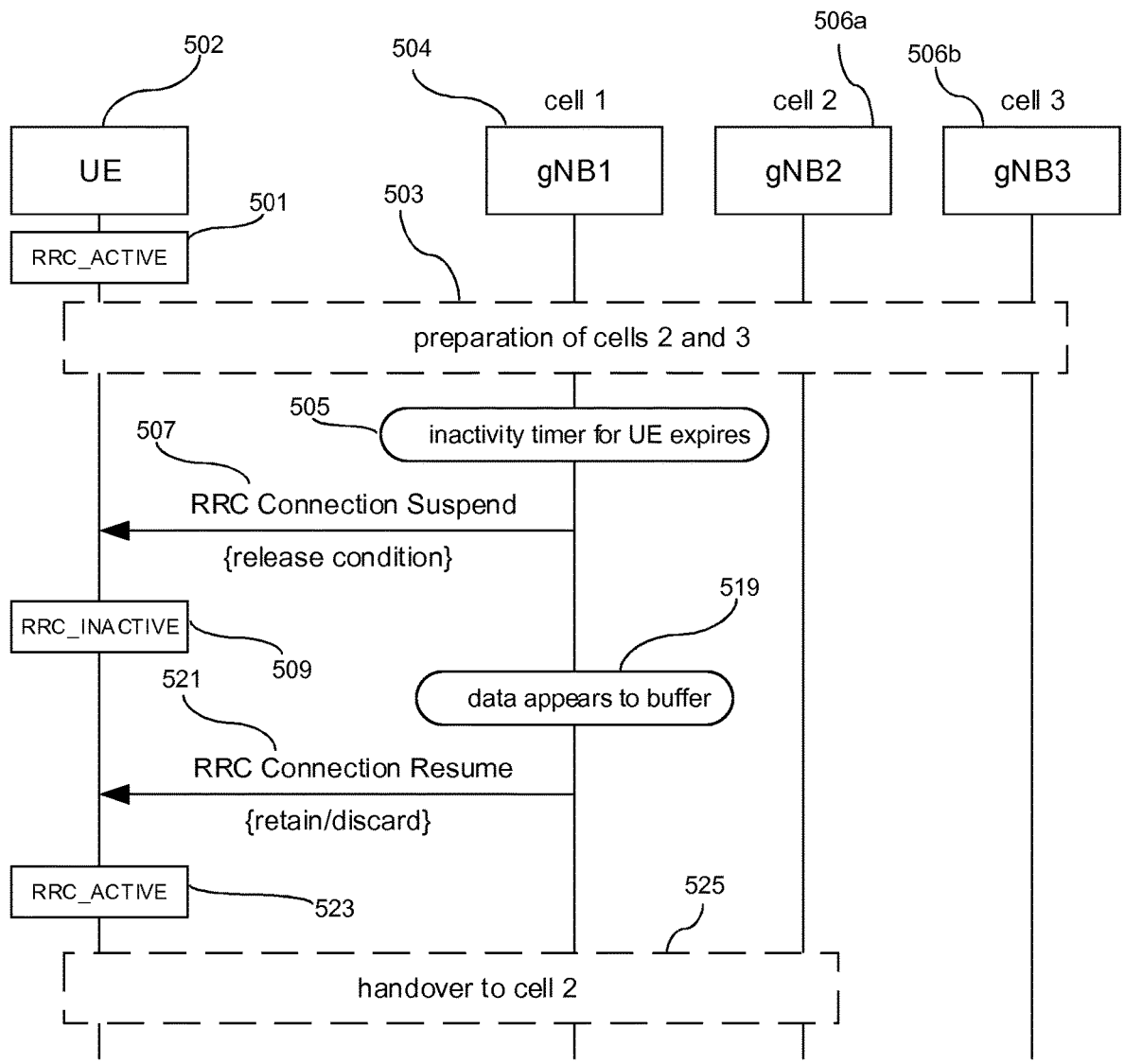
FIG. 5 shows another example of method for communicating between an apparatus and a network.

FIG. 5 shows an example of a method where prepared candidate cells 506a, 506b are retained while a UE 502 is in an inactive state. In subsequent data session, the prepared candidate cells can be exploited to carry out a conditional handover to one of the prepared cells 506a, 506b from cell 504.

Steps 501 to 509 are similar to steps 401 to 409 in FIG. 4.

At step 519, data is transmitted to UE 502 or to a network buffer (to gNB1 in FIG. 5). At step 521, base station 504 sends a message to UE 502 comprising instructions for the UE 502 to transition from an inactive state to an active state. In examples, at step 521 gNB1 504 sends an RRC Connection Resume message to UE 502. In examples, the RRC Connection Resume message contains a retain/discard field that will control the UE's actions with respect to prepared candidate cells gNB2 506a and gNB3 506b. In some examples, the RRC Connection Resume Message comprises an indication of whether the user equipment should retain or discard part or all of the preparation information for at least one cell. For example, the message may comprise an indication to release preparation information for gNB2 506a and not gNB3 506b, or vice versa. This may depend on certain conditions in each of the cells managed by gNB2 506a and gNB3 506b.

In examples where the UE is instructed to retain the prepared cells 506a and 506b (as shown in FIG. 5), the connection is resumed and UE 502 will start evaluating the CHO execution trigger(s) for the configured target cell(s). This option can be used to avoid unnecessary signalling due to re-preparation of candidate cells 506a and 506b.

In examples where UE 502 is instructed to discard the RRC configurations, UE 502 will discard all RRC configurations, triggering a removal procedure in the network side. In case UE 502 is still in the CHO region of the cell managed by gNB1 504 (which is likely as the cells were not released during RRC_INACTIVE state), a preparation procedure may start after a delay period. This option could be applied e.g. if the RRC configurations of the prepared target cells 506a and 506b are no longer valid.

At 523, UE 502 transitions to an active state. At 525, UE 502 accesses one of the target cells (cell 2 managed by gNB2 506a in FIG. 5) by utilizing one of the stored RRC configurations.

In examples, a reduction of the UE-network and network-network signalling overhead due to minimization of unnecessary prepare-release cycles is provided. Significant savings are provided in scenarios involving slow moving UEs, and/or short inactivity timers, and/or long CHO deconfiguration timers.

In examples, a reduction of the handover failures that occur due to a UE resuming connection before any cells are prepared is provided.

Figure 6:
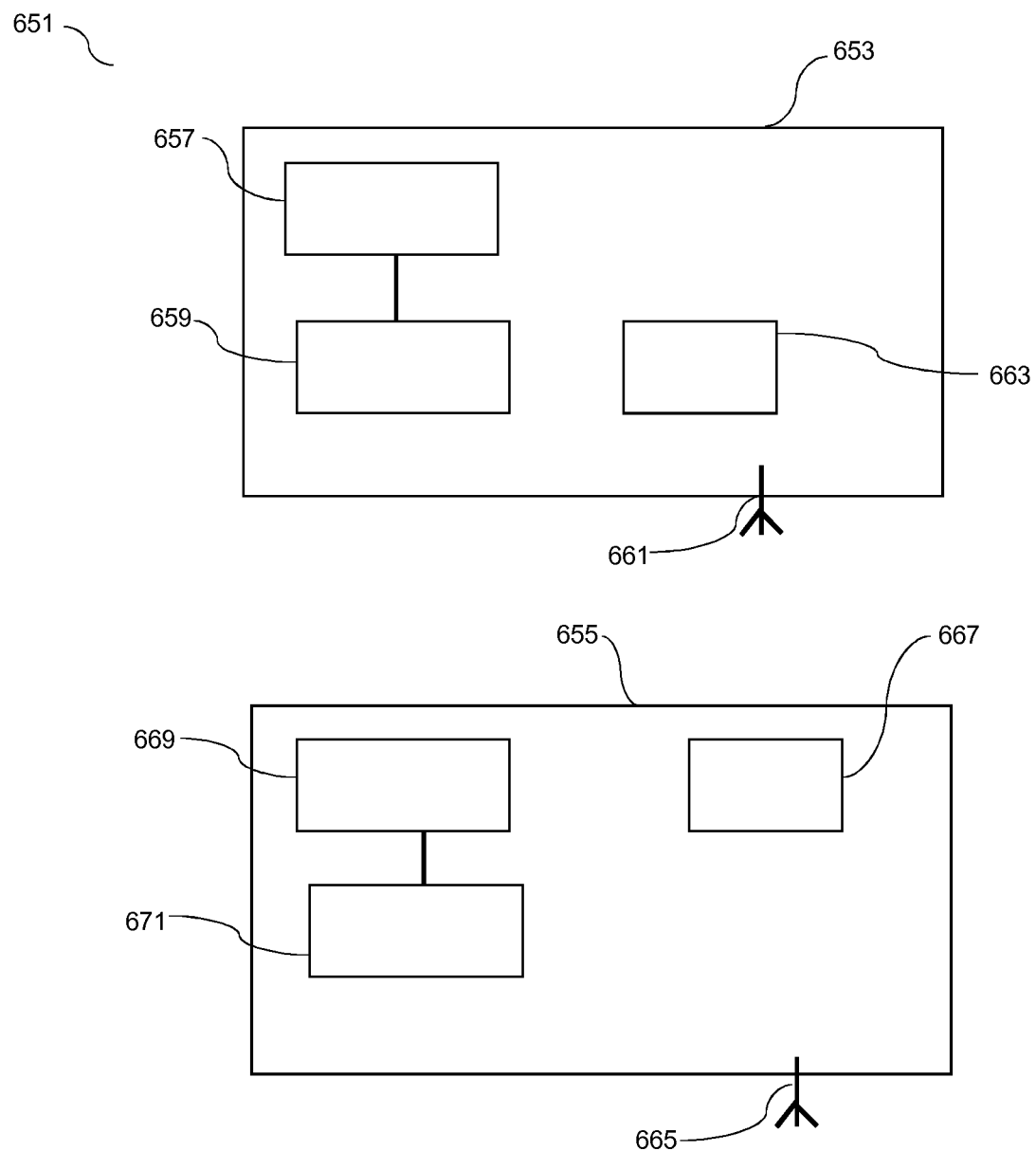
FIG. 6 shows an example of system.

An exemplary system of some examples will now be described in more detail with reference to FIG. 6 showing a schematic representation of a system 651. The exemplary system 651 comprises a first apparatus 653 and a second apparatus 655. The first apparatus 653 may be a UE. The second apparatus 655 may be a base station, for example, a gNB.

The first apparatus 653 may comprise at least at least one data processing entity 657, at least one memory 659, and other possible components for use in software and hardware aided execution of tasks it is designed to perform, including control of access to and communications with network devices and other communication devices. The at least one memory 659 may be in communication with the data processing entity 657, which may be a data processor. The data processing, storage and other relevant control apparatus can be provided on an appropriate circuit board and/or in chipsets.

The first apparatus 653 may optionally comprise a user interface such as key pad, voice commands, touch sensitive screen or pad, combinations thereof or the like. One or more of a display, a speaker and a microphone may optionally be provided. Furthermore, the first apparatus 653 may comprise appropriate connectors (either wired or wireless) to other devices and/or for connecting external accessories, for example hands-free equipment, thereto. The first apparatus 653 may receive signals over an air or radio interface via appropriate apparatus for receiving, and may transmit signals via appropriate apparatus for transmitting radio signals. In FIG. 6 a transceiver apparatus is shown schematically at 661. The transceiver apparatus 661 may be provided for example by means of a radio part and associated antenna arrangement. The antenna arrangement may be arranged internally or externally to the wireless device. The transceiver apparatus 661 may be controlled by communication unit 663.

The second apparatus 655 may receive signals over an air or radio interface via appropriate apparatus for receiving, and may transmit signals via appropriate apparatus for transmitting radio signals. In FIG. 2 a transceiver apparatus of second apparatus 655 is shown schematically at 665. The transceiver apparatus 665 may be provided for example by means of a radio part and associated antenna arrangement. The antenna arrangement may be arranged internally or externally to the wireless device. The transceiver apparatus 665 may be controlled by a communication unit 667.

The first apparatus 653 may be in contact with a second apparatus 655 over an interface. The second apparatus 655 may comprise at least at least one data processing entity 669, at least one memory 671, and other possible components for use in software and hardware aided execution of tasks it is designed to perform, including control of access to and communications with user devices and other communication devices. The at least one memory 671 may be in communication with the data processing entity 669, which may be a data processor. The data processing, storage and other relevant control apparatus can be provided on an appropriate circuit board and/or in chipsets.

Figure 7:
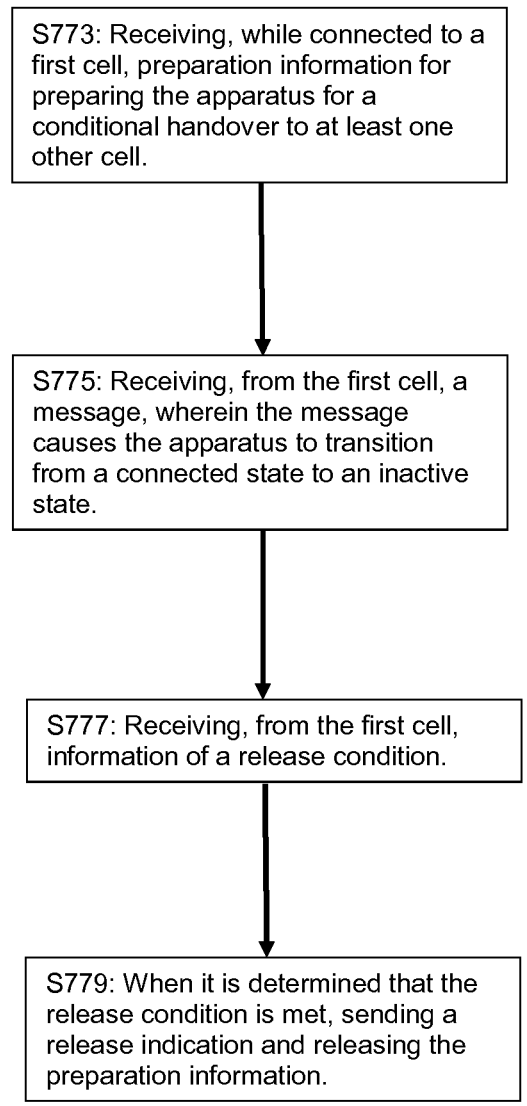
FIG. 7 shows a first method flow according to an example.

FIG. 7 shows an example method. The method may be performed by a user equipment. The method comprises receiving, while connected to a first cell, preparation information for preparing the apparatus for a conditional handover to at least one other cell at S773. At S775, the method comprises receiving, from the first cell, a message, wherein the message causes the apparatus to transition from a connected state to an inactive state. At S777, the method comprises receiving, from the first cell, information of a release condition. At S779, when it is determined that the release condition is met, sending a release indication and releasing the preparation information.

Figure 8:
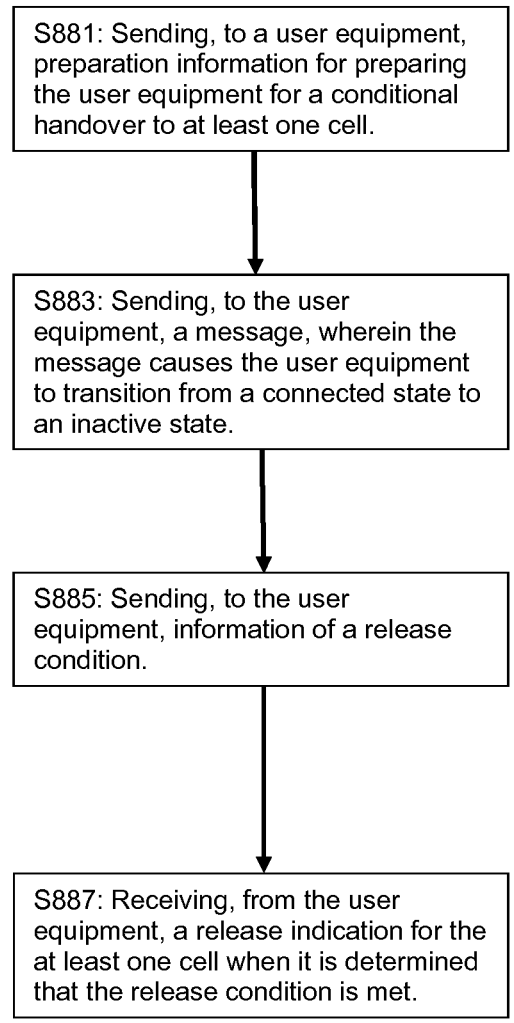
FIG. 8 shows a second method flow according to an example.

FIG. 8 shows an example method. The method may be performed by a base station. The method comprises sending, to a user equipment, preparation information for preparing the user equipment for a conditional handover to at least one cell at S881. At S883, the method comprises sending, to the user equipment, a message, wherein the message causes the user equipment to transition from a connected state to an inactive state. At S885, the method comprises sending, to the user equipment, information of a release condition. At S887, the method comprises receiving, from the user equipment, a release indication for the at least one cell when it is determined that the release condition is met.

In general, the various examples shown may be implemented in hardware or in special purpose circuits, software, logic or any combination thereof. Some aspects may be implemented in hardware, while other aspects may be implemented in firmware or software which may be executed by a controller, microprocessor or other computing device, although the invention is not limited thereto. While various aspects may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Some embodiments may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out methods are described in the present disclosure. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Examples of the disclosed embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. An apparatus, comprising
at least one processor; and
at least one memory including computer program code;
the at least one memory and the computer program code being configured to, with the at least one processor, cause the apparatus at least to perform:
receiving, while connected to a first cell, preparation information configured to prepare the apparatus for a conditional handover of the apparatus to at least one other cell;
receiving, from the first cell, a message, wherein the message is configured to cause the apparatus to transition from a connected state to an inactive state;
receiving, from the first cell, information of a release condition;
when it is determined that the release condition is met, sending a release indication and releasing the preparation information from the apparatus.

2. The apparatus according to claim 1, wherein the message comprises information of the release condition.

3. The apparatus according to claim 1, wherein determining that the information of the release condition is met comprises determining that a cell quality of a cell of the at least one other cell is below a quality threshold.

4. The apparatus according to claim 1, wherein determining that the release condition is met comprises determining that a cell quality of a cell of the at least one other cell is a predetermined number of decibels below a cell quality of another cell.

5. The apparatus according to claim 3, wherein the release indication is configured to release preparation information of the cell of the at least one other cell.

6. The apparatus according to claim 1, wherein the determining that the release condition is met comprises determining that a timer has expired.

7. The apparatus according to claim 1, wherein the release indication is configured to release preparation information of all cells prepared for a conditional handover.

8. An apparatus, comprising
at least one processor; and
at least one memory including computer program code;
the at least one memory and the computer program code being configured to, with the at least one processor, cause the device at least to perform:
sending, to a user equipment, preparation information configured to prepare the user equipment for a conditional handover to at least one cell;
sending, to the user equipment, a message, wherein the message is configured to cause the user equipment to transition from a connected state to an inactive state;
sending, to the user equipment, information of a release condition; and
receiving, from the user equipment, a release indication for the at least one cell when it is determined that the release condition is met.

9. The apparatus according to claim 8, wherein the message comprises the information of the release condition.

10. The apparatus according to claim 8, wherein the release condition is determined to be met when a cell quality of a cell of the at least one cell drops below a quality threshold.

11. The apparatus according to claim 8, wherein the release condition is met when the cell quality of a cell of the at least one cell drops a predetermined number of decibels below a cell quality of another cell.

12. The apparatus according to claim 10, wherein the release indication is configured to release preparation information of the cell of the at least one cell.

13. The apparatus according to claim 8, wherein the release condition is met when a timer at the user equipment expires.

14. The apparatus according to claim 8, wherein preparation information for all cells prepared for a conditional handover are released in response to determining that the release condition has been met.

15. A method comprising:
receiving, at an apparatus while connected to a first cell, preparation information configured to prepare the apparatus for a conditional handover to at least one other cell;
receiving, from the first cell, a message, wherein the message is configured to cause the apparatus to transition from a connected state to an inactive state;
receiving, from the first cell, information of a release condition;
when it is determined that the release condition is met, sending a release indication and releasing the preparation information.

16. A method, comprising:
sending, to a user equipment, preparation information configured to prepare the user equipment for a conditional handover to at least one cell;
sending, to the user equipment, a message, wherein the message is configured to cause the user equipment to transition from a connected state to an inactive state;
sending, to the user equipment, information of a release condition; and
receiving, from the user equipment, a release indication for the at least one cell when it is determined that the release condition is met.

* * * * *